United States Patent [19]

Halterman et al.

[11] Patent Number: 4,707,273

[45] Date of Patent: Nov. 17, 1987

[54] MANGANESE REMOVAL FROM AQUEOUS INDUSTRIAL WASTE EFFLUENTS

[75] Inventors: Diane Halterman, Norristown; Thomas Henley, Havertown, both of Pa.

[73] Assignee: Amchem Products, Ambler, Pa.

[21] Appl. No.: 860,269

[22] Filed: May 5, 1986

[51] Int. Cl.⁴ .................................................. C02F 1/52
[52] U.S. Cl. ..................................... 210/724; 210/726; 210/912; 210/915; 134/28
[58] Field of Search ............... 210/723, 724, 726, 912, 210/915; 423/50, 163, 306; 134/3, 13, 28, 41

[56] References Cited

U.S. PATENT DOCUMENTS 3,311,447  3/1967  Stuart ..................................... 423/50
3,575,853  4/1971  Gaughan et al. .................... 210/667

FOREIGN PATENT DOCUMENTS 2947364  5/1981  Fed. Rep. of Germany .
51-151   1/1976  Japan .
51-6350  1/1976  Japan .

*Primary Examiner*—Peter Hruskoci
*Assistant Examiner*—Jeffrey W. Peterson
*Attorney, Agent, or Firm*—Ernest G. Szoke; Henry E. Millson, Jr.

[57] ABSTRACT

A chemical treatment for the removal for manganese or manganese and fluoride from an aqueous waste effluent obtained from the acid-fluoride washing or alkali (non-fluoride) washing in a step in the manufacture of aluminum cans. The treatment consists of adding in an acid medium sufficient phosphate ion to react with the manganese and/or fluoride and thereafter adding in an alkali medium sufficient calcium ion to react with the manganese, phosphate and/or fluoride. The ratio of phosphate to calcium ion added is 3:1 to 1:2.5.

23 Claims, No Drawings

4,707,273

MANGANESE REMOVAL FROM AQUEOUS INDUSTRIAL WASTE EFFLUENTS

BACKGROUND OF THE INVENTION

1. Field of the Invention

The present invention relates to the removal of manganese from aqueous industrial waste effluents. The present invention particularly relates to the removal of manganese from industrial waste effluents containing other heavy metals and fluoride.

The Federal Environmental Protection Agency (EPA) has set Federal Guidelines for the standards and effluent limitations of pollutants discharged into navigable waters and into publicly owned treatment works. A particularly difficult problem has been the removal of manganese and other heavy metals from aqueous industrial waste effluents. The heavy metals depending on the industrial process involved may also contain pollutants such as fluoride and phosphorous which must also be controlled.

One of the industries now receiving attention is the aluminum can industry, i.e. the manufacture of aluminum cans. A step in the manufacture of aluminum cans is an acid fluoride wash or an alkaline (non-fluoride) wash.

The principle pollutants in the aqueous wash water waste effluent from aluminum can manufacturing plants are heavy metal ions such as aluminum, chromium, copper, iron, zinc and manganese, and anions such as fluoride and phosphorous, and oil and grease. The pollutants that are the most difficult to remove are manganese and fluoride.

The oil and grease removal and control needed will depend on the plant lubricant system used and will generally be carried out in a separate step, depending on the concentration of oil and grease in the effluent. The oil and grease removal step, when needed, can be carried out before or after the removal of heavy metals and fluoride.

BRIEF DESCRIPTION OF THE INVENTION

The present invention is directed to a method of treating aqueous waste effluents for the removal of manganese.

The present invention is particularly directed to a method of treating aqueous waste effluents for the removal of manganese or manganese and fluoride.

The present invention is more particularly directed to a method for chemically treating aqueous industrial waste effluents for the removal of manganese and other heavy metals or for the removal of manganese, other heavy metals and fluoride.

In an embodiment of the present invention the aqueous waste effluent from an acid fluoride washing step in a method of manufacturing aluminum cans is treated to remove manganese, other heavy metals and fluoride.

In another embodiment of the present invention the aqueous waste effluent from an alkaline (non-fluoride) washing step in a method of making aluminum or tin coated steel cans is treated to remove manganese and other heavy metals.

In accordance with an embodiment of the present invention the aqueous waste effluent is first treated with phosphate ion, e.g. phosphoric acid and is then treated with calcium ion, e.g. calcium hydroxide.

After the addition of the phosphoric acid the pH of the treated effluent is adjusted, if necessary, to about 2.0 to 3.0.

After the addition of the calcium hydroxide the pH of the treated effluent is adjusted, if necessary, to about pH 7–9.

The weight ratio of phosphate ion to calcium ion is an important parameter of the invention and is 3:1 to 1:2.5, preferably 2.5:1 to 1:1.5 and more preferably 2:1 to 1:1.

The result of this chemical treatment is to precipitate a calcium-manganese-phosphate complex and to at the same time, if fluoride is present, to precipitate a calcium-phosphate-fluoride complex and in some cases calcium fluoride. The manganese complex formed is believed to be $Ca_2Mn(PO_4)_2.2H_2O$. The calcium phosphate fluoride complex formed is believed to be $Ca_3(PO_4)_2CaF_2$, and the calcium fluoride is $CaF_2$.

2. Description of the Related Art

A variety of precipitation treatment methods are available for removal of metals and fluoride concentrations in aqueous waste effluents. The precipitation methods involve addition of treatment chemicals and the formation and separation of insoluble precipitates.

The heavy metals are most readily removed by precipitation as their corresponding hydroxides. The different metal hydroxides form maximum precipitation at different pH ranges. In some cases if this pH range is exceeded (either above or below), sufficient soluble metal concentrations remain to render the effluent unacceptable. Usually the "maximum insoluble precipitate" for most heavy metals ranges overlap sufficiently to allow co-precipitation and an acceptable effluent. However, the removal of manganese hydroxide precipitate has created a waste disposal problem, in that the manganese hydroxide is most insoluble at pH 10 to 11. This pH range is too high to allow useful co-precipitation with other metals of concern. Also, aqueous waste effluent can not be discharged at a pH of 10 to 11 but would first have to be neutralized to pH 7 to 9.

The removal of fluoride ion, when present, in the aqueous waste stream can also create a problem. The fluoride ion is readily precipitated as calcium fluoride by the addition of calcium hydroxide. The fluoride ion, however, shows a "maximum insoluble precipitate" of about 20 ppm at pH 7.5 to 8.5, but on the increase in alkalinity to pH 10 to 11 the fluoride ion can go back into solution. The presence of aluminum ions in the waste effluent results in the formation of an aluminum fluoride complex which further complicates fluoride removal.

A conventional method of treating an aqueous waste effluent from an acid fluoride washing step in the manufacture of aluminum cans is by neutralization with calcium hydroxide to about pH 8.0 to 9.0. The calcium hydroxide neutralization step reduces the fluoride concentration and the heavy metal ion concentration to acceptable levels, and in some cases the manganese concentration to acceptable levels as low as 0.13 ppm. However, higher manganese concentrations which are not acceptable are common.

Another conventional method of treating an aqueous waste effluent from an acid fluoride washing step has been by the addition of aluminum sulfate followed by neutralization with either sodium hydroxide or calcium hydroxide. The aluminum sulfate is added to the effluent as a first step based on initial fluoride concentration. The sodium hydroxide or calcium hydroxide is added in a second step in an amount to obtain optimum precipitation at pH 6.5 to 8.0.

Although this treatment method is very effective for fluoride and most heavy metals removal, it does not provide acceptable manganese removal. It is found that after precipitated solids separation, the manganese concentration is above acceptable levels, or at best borderline of the 0.21 ppm allowed for a waste discharge of 30 gallons per 1000 cans produced.

A double or two step precipitation procedure known to and recently developed by applicants for manganese concentration control achieves excellent manganese and fluoride removal from acid fluoride washing of aluminum cans and excellent removal of manganese from alkaline (non-fluoride) washing of aluminum cans. This double precipitation procedure requires the addition of a sufficient amount of calcium hydroxide to obtain pH of 10 to 11.0. This will precipitate the bulk of the soluble manganese and fluoride. The precipitate is separated and the supernatant liquid is treated by the addition of a small amount of sulfuric acid to obtain pH 7.0 to 9.0. This second step will result in the precipitation of the remaining heavy metals. The precipitate from the second precipitation step is removed to obtain a second supernatant liquid, which on analysis routinely achieves for acid fluoride washed cans a fluoride concentration of 5 ppm and for both acid fluoride and alkaline (non-fluoride) washed cans manganese concentrations of 0.05 ppm. The requirement for two precipitation steps and two separation steps, however, makes this double precipitation less attractive.

The Nov. 17, 1983 issue (Part II) of the Federal Register, Vol. 48, #223, page 52400, details standards of effluent limitations of pollutants discharged into navigable waters and into publicly owned treatment works by existing and new plants engaged in the manufacture of aluminum cans.

The Federal EPA established as its waste flow a recommended average of 22.17 gal/1000 cans produced. The data submitted in the examples in this application were based on a design to allow waste flow of about 30 gal/1000 cans produced. For purposes of clarity and ease of comparison applicants have translated the EPA "mass discharge" criteria into actual parameter concentrations for various flow rates of 20 gal, 30 gal and 50 gal overflow of aqueous wash effluent per 1000 cans produced which translated criteria are presented in the following Table.

TABLE 1

| EPA PRETREATMENT STANDARDS FOR EXISTING SOURCES FOR ALUMINUM CAN MAKING | | | |
|---|---|---|---|
| Outline of Allowed Concentration Vs. Rinse Overflow/1000 Cans | | | |
| Overflow/1000 Cans Gallons (liters) Pollutant | 20 (75.70) | 30 (113.55) | 50 (189.25) |
| Total Chromium ppm | 0.19 | 0.13 | 0.08 |
| Copper ppm | 1.11 | 0.74 | 0.44 |
| Zinc ppm | 0.68 | 0.45 | 0.27 |
| Manganese ppm | 0.32 | 0.21 | 0.13 |
| Fluoride ppm | 29.26 | 19.51 | 11.70 |
| Phosphorous ppm | 7.57 | 5.05 | 3.03 |
| Toxic Organics ppm | 0.17 | 0.11 | 0.07 |
| Oil and Grease ppm | 13.30 | 8.87 | 5.32 |

The problem confronting applicants was to develop a simple single precipitation step procedure for the treatment of aqueous waste effluents to reduce the manganese and other heavy metal concentrations, or manganese other heavy metal and fluoride concentrations to acceptable levels for discharge into public water systems.

The problem to be solved was to reduce the manganese concentration to less than 0.30 ppm, preferably less than 0.20 ppm and more preferably to less than 0.10 ppm, and to reduce the fluoride concentration to less than 30 ppm, preferably less than 20 ppm and more preferably to less than 10 ppm efficiently and at minimum expense.

DETAILED DESCRIPTION OF THE INVENTION

In accordance with the present invention applicants have unexpectedly and surprisingly found that the manganese concentration of aqueous waste effluents can be substantially reduced by treating the aqueous waste effluent first with a source of phosphate ion, e.g. phosphoric acid and second with a source of calcium ion, e.g. calcium hydroxide within specifically controlled weight ratios of phosphate ion and calcium ion. By the careful control of the weight ratio of phosphate ion to calcium ion and by providing a sufficient amount of phosphate ion and calcium ion to react with the manganese present, a complex mineral precipitate of calcium-manganese-phosphate is formed at a pH of about 7 to 9. The calcium-manganese-phosphate mineral complex precipitate removes a substantial amount of the manganese present in the aqueous waste effluent.

In the situations where manganese and fluoride ion are both present in the aqueous waste effluent, the addition of the phosphate ion followed by the addition of the calcium ion results in the reaction of the phosphate ion and calcium ion with fluoride ion to form a complex mineral precipitate of calcium-phosphate-fluoride and in some cases calcium fluoride at a pH of about 7 to 9. The calcium-phosphate-fluoride mineral complex precipitate and calcium fluoride precipitate remove a substantial amount of the fluoride present in the aqueous waste effluent.

In the treatment of an aqueous wash water effluent from an acid fluoride washing step in the manufacture of aluminum cans, the effluent pH can be from about pH 2.0 to 5.0. Where the pH is below about pH 3.0, no adjustment is made. Where the pH is above about 3.0, the pH is adjusted to about pH 2.0 to 3.0, either by the addition of the phosphate as phosphoric acid, or by the addition of sulfuric acid before or after the addition of phosphate ion. In the treatment of an aqueous wash water waste effluent from an alkaline (non-fluoride) washing step in the manufacture of aluminum cans or tin coated steel cans, the effluent pH can be from about pH 5 to 8. The pH in this case is adjusted to pH 2.0 to 3.0 either by the addition of phosphate as phosphoric acid, or by the addition of sulfuric acid before or after the addition of phosphate ion.

The calcium ion in both the acid fluoride and alkaline (non-fluoride) aqueous waste effluent treatment procedures can be added as calcium hydroxide or calcium oxide in which case the bulk of the alkalinity needed to achieve pH 7-9 is provided by the calcium hydroxide or calcium oxide. Where the amount of calcium hydroxide or calcium oxide used to obtain the needed calcium ion exceeds a pH of 7 to 9, the pH is adjusted to pH 7 to 9 with sulfuric acid to achieve the maximum precipitate. Where the needed amount of calcium hydroxide or calcium oxide does not achieve a pH 7 to 9, or where a calcium salt such as calcium chloride or calcium sulfate is used to provide the needed calcium ion, then the adjustment to pH 7 to 9 can be achieved by the addition of sodium hydroxide or potassium hydroxide to obtain maximum precipitate.

The aqueous waste effluents treated in accordance with the present invention can contain initial manganese ion concentrations of 0.20 to 5 ppm, generally 0.50 to 4 ppm, and more generally 0.75 to 3 ppm manganese ion.

The aqueous waste effluents treated in accordance with the present invention can contain initial fluoride ion concentrations of 20 to 500 ppm, generally 30 to 400 ppm and more generally 50 to 300 ppm fluoride ion.

The aqueous waste effluent is treated with a sufficient amount of phosphate ion and calcium ion to react with the manganese or manganese and fluoride to form the respective calcium-manganese-phosphate complex and calcium-phosphate-fluoride complex and in some cases calcium fluoride precipitates.

In the treatment of aqueous waste effluent containing manganese ion, the phosphate ion is added in an amount of 50 to 1000 ppm, preferably 100 to 800 ppm and more preferably 200 to 600 ppm based on the amount of manganese ion present in the aqueous waste effluent.

In the treatment of aqueous waste effluent containing manganese ion and fluoride ion, the phosphate ion is added in an amount of 500 to 6000 ppm and, preferably 1000 to 5000 ppm based on the amount of fluoride ion present in the aqueous waste effluent.

In the treatment of aqueous waste effluent containing manganese ion and fluoride ion the calcium ion is added in an amount of 250 to 3000 ppm and, preferably 500 to 2500 ppm based on the amount of fluoride ion present in the aqueous waste effluent.

In the treatment of aqueous waste effluents containing manganese ion or containing manganese and fluoride ion the weight ratio of phosphate ion to calcium ion is 3:1 to 1:2.5, preferably 2.5:1 to 1:1.5 and more preferably 2:1 to 1:1.

A sufficient amount of phosphate ion is added relative to the calcium ion to provide in the aqueous waste effluent a mole ratio of phosphate ion to calcium ion of 2.5:1 to 1:2.5, preferably 2:1 to 1:2 and more preferably 1.5:1 to 1:1.5.

In accordance with an embodiment of the present invention the necessary amount of phosphate ion is added, preferably as phosphoric acid to the aqueous waste effluent to be treated. After the addition of the necessary amount of phosphate ion, there is added to the waste effluent, if necessary, a mineral acid such as sulfuric acid to adjust the pH to 2.0 to 3.0 e.g. about pH 3.0. The acidification to pH of about 3.0 acts to break up stable organic complexes and enhance oil and grease separation. The acidification step is also helpful in the breakdown of synthetic oils for subsequent solids adsorption.

Where the waste water effluent is from an acid treating step and has a pH below ph 3.0 e.g. pH 2.0 to 3.0, no pH adjustment is needed to carryout the process of the present invention.

After the acidification step, a sufficient amount of calcium ion preferably in the form of calcium hydroxide is added to obtain the desired calcium ion concentration and the desired weight ratio of phosphate ion to calcium ion. The use of calcium hydroxide as the source of calcium ion provides a large portion of the alkalinity needed to neutralize the aqueous waste effluent being treated to pH of 7 to 9 to form the desired manganese or manganese and fluoride precipitates.

After the desired amount of calcium ion has been added, if the pH 7 to 9 has not been achieved, the neutralization can be completed by the addition of sodium hydroxide to obtain the pH 7 to 9. In some cases, however, the addition of the calcium hydroxide may have exceeded pH 7 to 9, in which case sulfuric acid can be added to obtain pH 7 to 9.

The phosphate ion is preferably added in the form of phosphoric acid. The use of phosphoric acid, particularly in treating alkaline waste effluents, assists in obtaining the initially desired pH 2.0 to 3.0. Though phosphoric acid is preferred, because of the relatively high cost of phosphate the phosphate ions can be added in the form of water soluble salts such as sodium or potassium phosphate. In this situation the pH 2.0–3.0 can be achieved by the use of a mineral acid such as sulfuric acid or hydrochloric acid.

The calcium ion is preferably added in the form of calcium hydroxide or calcium oxide in order to provide the bulk of the alkalinity to neutralize the aqueous waste effluent to the desired pH 7 to 9. The calcium ion, however, can be added as a water soluble calcium salt, such as calcium chloride or calcium sulfate.

Where the added calcium hydroxide or calcium oxide does not achieve the desired pH 7 to 9, the alkalinity can be increased by the addition of an alkali metal hydroxide, such as potassium hydroxide or sodium hydroxide.

Where the calcium salt, such as calcium chloride or calcium sulfate does not achieve the necessary alkalinity, the alkalinity can be increased to pH 7 to 9 by the addition of an alkali metal hydroxide, such as potassium hydroxide or sodium hydroxide.

In the situation where the addition of the needed amount of calcium hydroxide or calcium oxide causes the alkalinity to exceed pH 7 to 9, the alkalinity can be adjusted downwardly by the addition of sulfuric acid or hydrochloric acid.

In an embodiment of the present invention the aqueous waste effluent from an acid fluoride washing of aluminum cans is treated to substantially reduce the manganese concentration and other heavy metals concentration and to substantially reduce the fluoride ion concentration.

In another embodiment of the present invention the aqueous waste effluent from an alkaline (non-fluoride) washing of aluminum cans is treated to substantially reduce the manganese ion concentration and other heavy metal ion concentration.

In another embodiment of the present invention the aqueous waste effluent from an alkaline (non-fluoride) washing to tin coated steel cans is treated to substantially reduce the manganese ion concentration and other heavy metal ion concentration.

In accordance with the present invention the aqueous waste effluent from the acid fluoride washing and the alkaline (non-fluoride) washing of aluminum cans and the aqueous waste effluent from the alkaline (non-fluoride) washing of tin coated steel cans can be treated separately or one or more of the waste effluents can be combined and treated as a combined waste effluent.

The temperature at which the aqueous waste effluent is treated will depend to some extent on the manufacturing process which is the source of the waste effluent. The phosphate and calcium treating steps can be carried out at temperatures of about 40° to 110° F. (4° to 44° C.), preferably 60° to 90° F. (15° to 32° C.). Generally the treating step is carried out at about ambient temperatures.

In accordance with the process of the present invention manganese ion concentrations of less than 0.60 ppm and fluoride ion concentrations of less than 50 ppm can be obtained.

The low manganese ion concentrations and low fluoride ion concentrations are obtained while at the same time substantially reducing the concentrations of other heavy metals and substantially reducing the concentration of phosphorous and oil and grease to acceptable levels.

The present invention provides a simple treatment procedure whereby manganese and other heavy metals, or manganese other heavy metals and fluoride can be efficiently and effectively removed from aqueous waste effluent prior to discharge to public water systems.

The process of the present invention eliminates the need for a two step precipitation and a two step separation of solids and the necessary waste treatment equipment for the second steps.

In accordance with the present invention aqueous waste effluents can be treated in a single precipitation and single separation step to reduce the manganese concentration to less than 0.30 ppm, preferably less than 0.20 pppm and more preferably less than 0.10 ppm, and to reduce the fluoride concentration to less than 30 ppm, preferably less than 19 ppm and more preferably to less than 10 ppm.

The present invention will be better understood by the below examples which are presented as exemplary of the method of the invention.

EXAMPLE 1

Aqueous effluent waste test samples were prepared by adding manganese ion to tap water to make up 250 ml samples containing 2 ppm of manganese ion. The manganese was added to the tap water in the form of a manganese nitrate salt. The initial pH of the 2 ppm manganese samples was about pH 6 to 7. A sufficient amount of phosphoric acid was added to the samples to obtain phosphate concentrations of from 58 ppm to 500 ppm. After the addition of the phosphoric acid the samples had pH values in the range of about pH 2.0 to 4.0. The samples having a pH above pH 3.0 were adjusted to about pH 3.0 by the addition of sulfuric acid.

Calcium hydroxide was then added to the samples to obtain calcium ion concentrations in the range of 50 to 500 ppm. The addition of the calcium hydroxide neutralized the samples to about pH 6 to 11. The pH of each sample, as necessary, was adjusted by the addition of sodium hydroxide or sulfuric acid to pH 7 to 9 to obtain the maximum precipitate. For comparison purposes, some of the samples were treated only with phosphoric acid and some of the samples were treated only with calcium hydroxide. The relative weight ratio of phosphate ion to calcium ion was varied from about 1:3.5 to about 2:1.

The precipitate in each sample was removed by filtration and the filtrate analyzed for manganese ion concentration. The results obtained are reported in the following Table 2.

TABLE 2

| Initial Mn ppm | Phosphate Added (phosphoric acid) ppm | Calcium Added (Ca(OH)$_2$) ppm | Final Mn ppm |
| --- | --- | --- | --- |
| 2.0 | 0 | 0 | 1.7 |
| 2.0 | 0 | 104 | 1.3 |
| 2.0 | 0 | 232 | 0.42 |
| 2.0 | 58 | 104 | 0.82 |
| 2.0 | 58 | 207 | 0.35 |
| 2.0 | 100 | 50 | 0.15 |
| 2.0 | 200 | 0 | 2.1 |
| 2.0 | 200 | 100 | 0.05 |
| 2.0 | 200 | 200 | 0.08 |
| 2.0 | 200 | 300 | 0.07 |
| 2.0 | 200 | 500 | 0.15 |
| 2.0 | 300 | 150 | 0.08 |
| 2.0 | 500 | 250 | 0.04 |

The data show that at concentrations of 100 ppm or more of phosphate and at concentrations of 50 ppm or more of calcium and at weight ratios of phosphate to calcium of 2:1 to 1:2.5 that the maximum amount of manganese was removed to obtain manganese concentrations of 0.15 ppm or less, e.g. 0.04 to 0.08 ppm.

The Table 2 procedure was repeated with the exception that the calcium ions were supplied by the addition of calcium chloride rather than calcium hydroxide. In this procedure the bulk of the neutralization after addition of the calcium chloride was provided by the addition of sodium hydroxide to obtain a pH 7 to 9 and maximum precipitation.

As before the precipitated solids in each sample were removed by filtration and the filtrate analyzed for manganese ion concentration.

The results obtained are reported in the following Table 3.

TABLE 3

| Initial Mn ppm | Phosphate Added (phosphoric acid) ppm | Calcium Added (Ca(OH)$_2$) ppm | Final Mn ppm |
| --- | --- | --- | --- |
| 2.0 | 0 | 0 | 1.69 |
| 2.0 | 58 | 41 | 0.85 |
| 2.0 | 58 | 100 | 0.29 |
| 2.0 | 100 | 50 | 0.20 |
| 2.0 | 200 | 0 | 2.0 |
| 2.0 | 200 | 100 | 0.08 |
| 2.0 | 200 | 200 | 0.07 |
| 2.0 | 200 | 300 | 0.10 |
| 2.0 | 200 | 400 | 0.12 |
| 2.0 | 200 | 500 | 0.20 |
| 2.0 | 300 | 150 | 0.07 |
| 2.0 | 500 | 250 | 0.03 |

The data show that at concentrations of 100 ppm or more of phosphate and at concentrations of 50 ppm or more of calcium and at weight ratios of phosphate to calcium of 2:1 to 1:2.5 that the maximum amount of manganese was removed to obtain manganese concentrations of 0.20 ppm or less, e.g. 0.03 to 0.08 ppm.

EXAMPLE 2

In order to determine the effectiveness of the present method of manganese removal from aqueous waste effluents containing relatively larger concentrations of manganese the procedure of Example 1 was repeated with the exception that the 250 ml samples tested contained 5.0 ppm of manganese instead of 2.0 ppm.

In this example the phosphoric acid was added to obtain phosphate concentrations of 58 to 800 ppm. Calcium hydroxide was added to obtain calcium ion concentrations of 104 to 500 ppm.

The precipitated solids in each sample were removed by filtration and the filtrate analyzed for manganese ion concentration.

The results obtained are reported in the following Table 4.

TABLE 4

| Initial Mn ppm | Phosphate Added (phosphoric acid) ppm | Calcium Added (Ca(OH)$_2$) ppm | Final Mn ppm |
|---|---|---|---|
| 5.0 | 0 | 0 | 4.0 |
| 5.0 | 0 | 104 | 3.8 |
| 5.0 | 58 | 104 | 1.8 |
| 5.0 | 58 | 232 | 1.3 |
| 5.0 | 200 | 0 | 4.8 |
| 5.0 | 200 | 100 | 0.49 |
| 5.0 | 200 | 200 | 0.41 |
| 5.0 | 300 | 200 | 0.30 |
| 5.0 | 400 | 200 | 0.05 |
| 5.0 | 200 | 300 | 0.34 |
| 5.0 | 200 | 400 | 0.21 |
| 5.0 | 200 | 500 | 0.26 |
| 5.0 | 400 | 400 | 0.07 |
| 5.0 | 600 | 400 | 0.17 |
| 5.0 | 800 | 400 | 0.09 |

The data shows that at concentrations of 200 ppm or more of phosphate and at concentrations of 300 ppm or more of calcium and at weight ratios of phosphate to calcium of 2:1 to 1:2.5 that the maximum amount of manganese was removed to obtain manganese concentrations of 0.34 ppm or less, i.e. 0.05 to 0.17 ppm.

EXAMPLE 3

Acid Fluoride Wash Effluent

In order to compare the process of the present invention with the conventionally used calcium hydroxide neutralization of acid-fluoride washing of aluminum cans, effluent waste samples were taken from five operating aluminum can manufacturing plants.

Test samples of 500 ml each were prepared and the treatment was carried out to simulate a water overflow of 30 gal/1000 cans produced.

(a) Following the process of the present invention in a first step a sufficient amount of phosphoric acid is added to the sample to obtain a phosphate ion concentration of about 1100 to 4600 ppm (five plants).

In a second step a sufficient amount of calcium hydroxide is added to the sample to obtain a calcium ion concentration of 660 to 1950 ppm (five plants) and a pH 8.0 to 9.0. The weight ratio of phosphate ion to calcium ion was in the range of 1.4:1 to 3.3:1 (five plants).

The precipitated solids were settled and separated, and the supernatant liquid analyzed for manganese, other heavy metals, fluoride and phosphorous.

(b) For purposes of comparison and following the conventional calcium hydroxide neutralization procedure, there was added to 500 ml samples a sufficient amount of calcium hydroxide to obtain a pH 8.0 to 9.0.

The precipitated solids were settled and removed and the supernatant liquid analyzed for manganese, other heavy metals, fluoride and phosphorous.

In each sample the precipitation was carried out to obtain maximum precipitate.

The results obtained from the samples from the five plants were as follows.

ACID FLUORIDE WASH EFFLUENT
PLANT 1

|  | Untreated Washer Effluent Waste | Invention* H$_3$PO$_4$/Ca(OH)$_2$ Addition | Comparison Ca(OH)$_2$ Addition |
|---|---|---|---|
| pH | 2.2 | 8.3 | 8.3 |
| Aluminum ppm | 153.0 | 0.85 | 1.65 |
| Total Chromium ppm | 0.15 | 0.07 | 0.07 |
| Copper ppm | 0.10 | 0.10 | 0.10 |
| Iron ppm | 2.06 | 0.10 | 0.10 |
| Manganese ppm | 1.34 | 0.05 | 0.64 |
| Zinc ppm | 0.06 | 0.02 | 0.02 |
| Fluoride ppm | 156.0 | 8.3 | 25.0 |
| Phosphorous ppm | — | 2.5 | 1.0 |
| Oil & Grease ppm (503E Standard) | 183 | 10.0 | 10.0 |

*The phosphate ion was added in an amount of 4600 ppm and the calcium ion was added in an amount of 1950 ppm and the weight ratio of phosphate to calcium was 2.4:1.0.

PLANT 2

|  | Untreated Washer Effluent Waste | Invention* H$_3$PO$_4$/Ca(OH)$_2$ Addition | Comparison Ca(OH)$_2$ Addition |
|---|---|---|---|
| pH | 2.4 | 8.2 | 8.9 |
| Aluminum ppm | 68.8 | 0.85 | 8.13 |
| Total Chromium ppm | 0.14 | 0.07 | 0.07 |
| Copper ppm | 0.10 | 0.10 | 0.10 |
| Iron ppm | 0.98 | 0.15 | 0.61 |
| Manganese ppm | 0.88 | 0.05 | 0.20 |
| Zinc ppm | 0.15 | 0.04 | 0.08 |
| Fluoride ppm | 55.0 | 5.3 | 16.5 |
| Phosphorous ppm | — | 3.1 | 1.0 |
| Oil & Grease ppm (503E Standard) | 175 | 10.0 | 16.0 |

*The phosphate ion was added in an amount of 1518 ppm and the calcium ion was added in an amount of 1105 ppm and the weight ratio of phosphate to calcium was 1.4:1.0.

PLANT 3

|  | Untreated Washer Effluent Waste | Invention* H$_3$PO$_4$/Ca(OH)$_2$ Addition | Comparison Ca(OH)$_2$ Addition |
|---|---|---|---|
| pH | 2.0 | 8.6 | 8.7 |
| Aluminum ppm | 197.0 | 0.85 | 5.6 |
| Total Chromium ppm | 0.46 | 0.07 | 0.07 |
| Copper ppm | 0.22 | 0.21 | 0.20 |
| Iron ppm | 4.02 | 0.70 | 1.4 |
| Manganese ppm | 2.25 | 0.05 | 0.62 |
| Zinc ppm | 1.25 | 0.15 | 0.40 |
| Fluoride ppm | 173.0 | 10.2 | 8.1 |
| Phosphorous ppm | 6.5 | 3.1 | 2.0 |
| Oil & Grease ppm (503E Standard) | 389.0 | 10.0 | 250.0 (No polymer) |

*The phosphate ion was added in an amount of 2300 ppm and the calcium ion was added in an amount of 1625 ppm and the weight ratio of phosphate to calcium was 1.4:1.0.

PLANT 4

|  | Untreated Washer Effluent Waste | Invention* H$_3$PO$_4$/Ca(OH)$_2$ Addition | Comparison Ca(OH)$_2$ Addition |
|---|---|---|---|
| pH | 2.4 | 8.7 | 8.6 |

-continued

| PLANT 4 | | | |
|---|---|---|---|
| | Untreated Washer Effluent Waste | Invention* $H_3PO_4/Ca(OH)_2$ Addition | Comparison $Ca(OH)_2$ Addition |
| Aluminum ppm | 58.5 | 0.85 | 5.3 |
| Total Chromium ppm | 0.22 | 0.07 | 0.07 |
| Copper ppm | 0.22 | 0.10 | 0.10 |
| Iron ppm | 1.7 | 0.10 | 0.33 |
| Manganese ppm | 0.79 | 0.05 | 0.15 |
| Zinc ppm | 0.58 | 0.02 | 0.02 |
| Fluoride ppm | 65.0 | 6.3 | 13.0 |
| Phosphorous ppm | 1.6 | 1.8 | 1.0 |
| Oil & Grease ppm (503E Standard) | 275.0 | 8.0 | 50.0 (No polymer) |

*The phosphate ion was added in an amount of 1150 ppm and the calcium ion was added in an amount of 660 ppm and the weight ratio of phosphate to calcium was 1.7:1.0.

| PLANT 5 | | | |
|---|---|---|---|
| | Untreated Washer Effluent Waste | Invention* $H_3PO_4/Ca(OH)_2$ Addition | Comparison $Ca(OH)_2$ Addition |
| pH | 2.3 | 8.4 | 8.5 |
| Aluminum ppm | 111.0 | 0.85 | 2.57 |
| Total Chromium ppm | 0.07 | 0.07 | 0.07 |
| Copper ppm | 0.10 | 0.10 | 0.10 |
| Iron ppm | 0.59 | 0.10 | 0.10 |
| Manganese ppm | 1.21 | 0.05 | 0.42 |
| Zinc ppm | 0.27 | 0.02 | 0.02 |
| Fluoride ppm | 105.0 | 8.1 | 24.0 |
| Phosphorous ppm | 2.8 | 5.4 | 1.0 |
| Oil & Grease ppm (503E Standard) | 72.0 | 10.0 | 10.0 (No polymer) |

*The phosphate ion was added in an amount of 2990 ppm and the calcium ion was added in an amount of 910 ppm and the weight ratio of phosphate to calcium was 3.3:1.

The data show that the process of the present invention for all Plants 1-5 test samples (water overflow of 30 gal/1000 cans produced) reduced the manganese ion concentration to 0.05 ppm and reduced the fluoride ion concentration to 10.2 ppm (Plant 3) or less.

The comparison conventionally used calcium hydroxide neutralization procedure on the other hand obtained manganese ion concentrations of 0.15 to 0.64 ppm and fluoride ion concentrations of 8.1 to 25 ppm.

EXAMPLE 4

Acid Fluoride Wash Effluent

In this example, samples were taken from a waste effluent from an operating aluminum can manufacturing plant using an acid fluoride wash. Test samples of 500 ml each were prepared and the treatment in each case was carried out to simulate a water overflow of 30 gal/1000 cans produced. A comparison of the inventive process was made with the conventional calcium hydroxide neutralization, and the double precipitation method developed by applicants for manganese or manganese and fluoride removal.

(a) Following the process of the present invention in a first step a sufficient amount of phosphoric acid is added to the sample to obtain a phosphate ion concentration of about 2300 ppm.

In a second step a sufficient amount of calcium hydroxide is added to the sample to obtain a calcium ion concentration of about 1040 ppm and pH 8.0-9.0. The weight ratio of phosphate ion to calcium ion was about 2.2:1. The precipitated solids were settled and removed and the supernatant liquid analyzed as before.

(b) For purposes of comparison and following the conventional calcium hydroxide neutralization procedure, there was added to the sample a sufficient amount of calcium hydroxide to obtain pH 8.0-9.0. The precipitated solids were settled and removed and the supernatant liquid analyzed as before.

(c) For purposes of comparison and following the double precipitation method developed by applicants, a sufficient amount of calcium hydroxide was added to the sample to obtain pH 10.0-11.0. This resulted in the precipitation of the bulk of the manganese and fluoride. The precipitate was settled and removed and the first supernated liquid was acidified by the addition of sulfuric acid to obtain pH 8 to 9.0. Most of the remaining heavy metals, e.g. aluminum, copper, chromium and iron were precipitated from solution at pH 8 to 9.0. The precipitated solids were removed by filtration and the filtrate was analyzed as before.

In each test sample the precipitation was carried out to obtain the maximum precipitate.

The results obtained are as follows.

| ACID FLUORIDE WASH EFFLUENT PLANT 6 | | | | | |
|---|---|---|---|---|---|
| | Influent Waste | Invention* $H_3PO_4/$ $Ca(OH)_2$ | Comparison $Ca(OH)_2$ to pH 8-9 | Comparison Double Precipitation | |
| | | | | $Ca(OH)_2$ to pH 10-11 | $H_2SO_4$ to pH 8-9 |
| pH | 2.5 | 8.3 | 8.8 | 10.6 | 8.2 |
| Aluminum ppm | 148 | 0.85 | 6.0 | 78.0 | 0.85 |
| Total Chromium ppm | 0.13 | 0.07 | 0.07 | 0.10 | 0.07 |
| Copper ppm | 0.11 | 0.10 | 0.10 | 0.10 | 0.10 |
| Iron ppm | 1.35 | 0.10 | 0.10 | 0.80 | 0.10 |
| Manganese ppm | 1.9 | 0.05 | 0.14 | 0.05 | 0.05 |
| Zinc ppm | 0.10 | 0.02 | 0.02 | 0.02 | 0.02 |
| Fluoride ppm | 97 | 7.8 | 16.8 | 5.4 | 5.4 |
| Phosphorous ppm | 2.2 | 1.0 | 1.0 | 1.0 | 1.0 |
| Oil & Grease (503E ppm) | 18 | 10.0 | 10.0 | 10.0 | 10.0 |
| | | (No polymer) | (No polymer) | (No polymer) | (No polymer) |
| Chemical Usage/1000 Gal. | | | | | |
| Phosphoric Acid (75% conc.) | | 2.0 gal. | — | — | — |

-continued

ACID FLUORIDE WASH EFFLUENT PLANT 6

|  | Influent Waste | Invention* $H_3PO_4$/ $Ca(OH)_2$ | Comparison $Ca(OH)_2$ to pH 8–9 | Comparison Double Precipitation | |
|---|---|---|---|---|---|
|  |  |  |  | $Ca(OH)_2$ to pH 10–11 | $H_2SO_4$ to pH 8–9 |
| $Ca(OH)_2$ |  | 16.0 lbs. | 2.8 lbs. | 18.0 lbs. | — |
| Sulfuric Acid (98% conc.) |  | — | — | — | 0.25 gal. |

*The phosphate ion was added in an amount of 2300 ppm and the calcium ion was added in an amount of 1040 ppm and the weight ratio of phosphate to calcium was 2.2:1.0.

The data show that the method of the present invention obtains superior manganese and fluoride removal as compared to the conventional calcium hydroxide neutralization procedure and achieves results comparable to those obtained by the double precipitation method.

EXAMPLE 5

Alkaline Wash Effluent

In this example samples were taken from the waste effluents from two operating aluminum can manufacturing plants using an alkaline (non-fluoride) wash. Test samples of 500 ml each were prepared and the treatment was carried out to simulate a water overflow of 30 gal/1000 cans produced. Comparisons of the inventive process were made with the conventional calcium hydroxide neutralization procedure and the double precipitation method developed by applicants for the removal of manganese.

(a) Following the process of the present invention in a first step, a sufficient amount of phosphoric acid was added to the sample to obtain a phosphate ion concentration of 500 to 600 ppm and a pH 2.5 to 3.5 (two plants). In the samples in which the pH was above pH 3.0, sulfuric acid was added until a pH about 3.0 was obtained. The acidification of the samples to pH 2.0 to 3.0 acts to break up stable organic complexes and enhance oil separation, and to break down synthetic oils for subsequent solids absorption.

In a second step a sufficient amount of calcium hydroxide was added to the sample to obtain a calcium ion concentration of 200 to 300 ppm and pH 8.0–9.0. The weight ratio of phosphate to calcium was in the range of 2.2:1 to 2:1 (two plants).

The precipitated solids were settled and removed and the supernatant liquid analyzed as before.

(b) For purposes of comparison and following the conventional calcium hydroxide neutralization procedure for treating alkaline (non-fluoride) wash waste effluents, there was added to the samples a sufficient amount of sulfuric acid to obtain pH 2.0–3.0. The acidified waste effluent samples were then neutralized by the addition of a sufficient amount of calcium hydroxide to obtain pH 7.0–9.0. The precipitates were settled and separated and the supernatant liquids analyzed as before.

(c) For purposes of comparison and following the double precipitation method developed by applicants for removal of manganese, sulfuric acid was added to the samples until a pH 2.0–3.0 was obtained. Calcium hydroxide was then added in a sufficient amount to obtain pH 10 to 11 and to precipitate the bulk of the manganese and fluoride. The precipitates were settled and removed and the first supernatant liquids analyzed as before. The supernatant liquids were then acidified by the addition of sulfuric acid to obtain pH 8 to 9. Most of the remaining heavy metals were precipitated at pH 8 to 9. The precipitated solids were removed by filtration and the filtrates were analyzed as before.

In each test sample the precipitation was carried out to obtain the maximum precipitate.

The results obtained are as follows.

ALKALINE WASH EFFLUENT PLANT 7

| ANALYSIS | Influent Waste | Invention* $H_3PO_4$/ $Ca(OH)_2$ | Comparison $Ca(OH)_2$ to pH 8–9 | Comparison Double Precipitation | |
|---|---|---|---|---|---|
|  |  |  |  | $Ca(OH)_2$ to pH 10–11 | $H_2SO_4$ to pH 8–9 |
| pH | 6.2 | 8.8 | 8.5 | 11.7 | 8.6 |
| Aluminum ppm Total | 27.6 | 0.85 | 2.41 | 9.5 | 2.9 |
| Chromium ppm | 0.07 | 0.07 | 0.07 | 0.07 | 0.06 |
| Copper ppm | 0.10 | 0.10 | 0.10 | 0.10 | 0.10 |
| Iron ppm | 0.41 | 0.10 | 0.10 | 0.10 | 0.10 |
| Manganese ppm | 0.68 | 0.05 | 0.24 | 0.05 | 0.05 |
| Zinc ppm | 0.06 | 0.02 | 0.02 | 0.02 | 0.02 |
| Fluoride ppm | 2.5* | 1.0 | 2.1 | 1.0 | 1.0 |
| Phosphorous ppm |  | 3.3 | 1.0 | 1.0 | 1.0 |
| Oil & Grease (503E ppm) |  | 10.0 | 18.0 | 10.0 | — |
|  |  | (No polymer) | (No polymer) | (No polymer) | (No polymer) |

*Residual fluoride from tap water or other can process step.
*The phosphate ion was added in an amount of 575 ppm and the calcium ion was added in an amount of 260 ppm and the weight ratio of phosphate to calcium was 2.2:1.0.

| | Influent Waste | **Invention $H_3PO_4$/ $Ca(OH)_2$ | Comparison $Ca(OH)_2$ to pH 8-9 | Comparison Double Precipitation $Ca(OH)_2$ to pH 10-11 | $H_2SO_4$ to pH 8-9 |
|---|---|---|---|---|---|
| PLANT 8 | | | | | |
| pH | 7.0 | 8.5 | 8.8 | 10.1 | 8.0 |
| Aluminum ppm Total | 127 | 0.85 | 3.83 | 29.2 | 1.1 |
| Chromium ppm | 0.07 | 0.07 | 0.07 | 0.07 | 0.07 |
| Copper ppm | 0.11 | 0.10 | 0.10 | 0.10 | 0.10 |
| Iron ppm | 0.48 | 0.10 | 0.10 | 0.10 | 0.10 |
| Manganese ppm | 1.08 | 0.05 | 0.13 | 0.05 | 0.05 |
| Zinc ppm | 0.24 | 0.02 | 0.02 | 0.02 | 0.02 |
| Fluoride ppm | 1.0* | 1.0 | 1.0 | 1.0 | 1.0 |
| Phosphorous ppm | 1.0 | 1.0 | 1.0 | 1.0 | 1.0 |
| Oil & Grease (503E ppm) | 112 | 38.0 | 56.0 | 48.0 | 48.0 |
| | | (No polymer) | (No polymer) | (No polymer) | (No polymer) |
| Chemical Usage/1000 Gal. (PLANT 8) | | | | | |
| Phosphoric Acid (75% conc.) | | 0.5 gal. | — | — | — |
| $Ca(OH)_2$ | | 4.4 lbs. | 5.2 lbs. | 7.6 lbs. | — |
| Sulfuric Acid (98% conc.) | | — | 0.4 gal. | — | 0.20 gal. |

*Residual fluoride from tap water or other can process step.
**The phosphate ion was added in an amount of 575 ppm and the calcium ion was added in an amount of 285 ppm and the weight ratio of phosphate to calcium was 2.0:1.0.

The data show that the method of the present invention obtains superior manganese and aluminum ion removal as compared to the conventional calcium hydroxide neutralization procedure and achieves results comparable to those obtained by the double precipitation method with regard to manganese and other heavy metal removal.

SUMMARY

The process of the present invention can advantageously be used to remove manganese ions from industrial aqueous waste effluents, or manganese and fluoride ions from industrial aqueous waste effluents.

The process of the present invention has particular application in the removal of manganese and other heavy metals or manganese and other heavy metals and fluoride ions from the water overflow from acid fluoride wash in the manufacture of aluminum cans and alkali (non-fluoride) wash in the manufacture of aluminum cans and tin coated steel cans.

The process of the present invention can be used to treat the combined aqueous waste effluents from one or more of an acid fluoride wash from the manufacture of aluminum cans and/or the alkaline (non-fluoride) wash from the manufacture of aluminum or tin coated steel cans.

The above examples and description are given as merely being exemplary of the present invention which is to be limited only by the scope of the appended claims.

What is claimed is:

1. A method for the removal of manganese and other heavy metals and fluoride from an aqueous waste effluent containing up to about 500 ppm fluoride ion and about 0.5 to about 5 ppm manganese ion from an acid fluoride wash step in the manufacture of aluminum cans comprising
  (a) adding a sufficient amount of phosphate ion to the effluent to react with the manganese and fluoride;
  (b) adjusting the pH of the phosphate-treated effluent to a pH of about 2.0 to 3.0 when the pH of the effluent is outside this range;
  (c) adding a sufficient amount of calcium ion to react with the manganese, fluoride, and phosphate and form a calcium-manganese-phosphate complex and a calcium-phosphate-fluoride complex;
  (d) adjusting the pH of the calcium-treated effluent to about 7.0 to 9.0 when the pH of this effluent is outside this range to coprecipitate the manganese and fluoride complexes and produce a purified effluent containing less than about 0.60 ppm manganese ion and less than about 50 ppm fluoride ion; and
  (e) separating the precipitate from the effluent; wherein the ratio of added phosphate ion to added calcium ion is about 3:1 to 1:2.5.

2. The method of claim 1 wherein the fluoride precipitate further comprises calcium fluoride.

3. The method of claim 1 wherein the untreated aqueous waste effluent contains 30 to 400 ppm fluoride.

4. The method of claim 1 wherein the weight ratio of phosphate ion to calcium ion is 2.5:1 to 1:1.5.

5. The method of claim 1 wherein the phosphate ion is added as phosphoric acid.

6. The method of claim 1 wherein the calcium ion is added as calcium hydroxide or calcium oxide.

7. The method of claim 1 wherein the calcium ion is added as calcium chloride.

8. The method of claim 1 wherein the phosphate ion is added in an amount of 500 to 6000 ppm and the calcium ion is added in an amount of 250 to 3000 ppm, based on the amount of fluoride in the aqueous waste effluent.

9. The method of claim 1 wherein the manganese concentration is reduced to less than 0.30 ppm.

10. The method of claim 1 wherein the manganese concentration is reduced to less than 0.10 ppm.

11. The method of claim 1 wherein the fluoride concentration is reduced to less than 30 ppm.

12. The method of claim 1 wherein the fluoride concentration is reduced to less than 10 ppm.

13. A method for the removal of manganese and other heavy metals from the aqueous waste effluent containing about 0.5 to about 5 ppm manganese from an alkali wash step in the manufacture of aluminum or tin cans comprising
(a) adding a sufficient amount of phosphate ion to react with the manganese;
(b) adjusting the pH of the phosphate-treated effluent to a pH of about 2.0 to 3.0 when the pH of the effluent is outside this range;
(c) adding a sufficient amount of calcium ion to react with the manganese and phosphate to form a calcium-manganese-phosphate complex;
(d) adjusting the pH of the calcium-treated effluent to about 7.0 to 9.0 when the pH of this effluent is outside this range to precipitate the complex and produce a purified effluent containing less than about 0.60 ppm manganese; and
(e) separating the precipitate from the effluent;
wherein the weight ratio of added phosphate ion to added calcium ion is about 3:1 to 1:2.5.

14. The method of claim 13 wherein the aqueous effluent contains 0.50 to 4.0 ppm manganese.

15. The method of claim 13 wherein the weight ratio of phosphate ion to calcium ion is 2.5:1 to 1:1.5.

16. The method of claim 13 wherein the phosphate ion is added as phosphoric acid.

17. The method of claim 13 wherein the calcium ion is added as calcium hydroxide or calcium oxide.

18. The method of claim 13 wherein the calcium ion is added as calcium chloride.

19. The method of claim 13 wherein the aqueous waste effluent is from the manufacture of aluminum cans.

20. The method of claim 13 wherein the aqueous waste effluent is from the manufacture of tin cans.

21. The method of claim 13 wherein the manganese concentration is reduced to less than 0.20 ppm.

22. The method of claim 13 wherein the manganese concentration is reduced to less than 0.10 ppm.

23. The method of claim 13 wherein the phosphate ion is added in an amount of 100 to 800 ppm and the calcium ion is added in an amount of 100 to 600 ppm.

* * * * *